United States Patent
Yoon et al.

(10) Patent No.: US 11,315,742 B2
(45) Date of Patent: Apr. 26, 2022

(54) FREELY DETACHABLE STICKER-TYPE ELECTRONIC DEVICE, METHOD OF MANUFACTURING THE SAME, AND METHOD OF FORMING ELECTRODE FOR THE SAME

(71) Applicant: KOREA INSTITUTE OF ENERGY RESEARCH, Daejeon (KR)

(72) Inventors: Hana Yoon, Daejeon (KR); Chung-yul Yoo, Daejeon (KR); Sang-hyun Park, Daejeon (KR); Jung-Joon Yoo, Daejeon (KR); Younghyun Cho, Asan-si (KR); Yeoung A Lee, Daejeon (KR); Jiyoung Lee, Daejeon (KR); Jaehyun Jeon, Daegu (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 139 days.

(21) Appl. No.: 16/158,296

(22) Filed: Oct. 12, 2018

(65) Prior Publication Data
US 2020/0006751 A1    Jan. 2, 2020

(30) Foreign Application Priority Data
Jul. 2, 2018    (KR) ........................ 10-2018-0076653

(51) Int. Cl.
H01G 11/26    (2013.01)
H01G 11/36    (2013.01)
H01G 11/86    (2013.01)
H01G 11/82    (2013.01)

(52) U.S. Cl.
CPC ............ *H01G 11/26* (2013.01); *H01G 11/36* (2013.01); *H01G 11/82* (2013.01); *H01G 11/86* (2013.01)

(58) Field of Classification Search
CPC .................................................... H01G 11/82
See application file for complete search history.

(56) References Cited

U.S. PATENT DOCUMENTS

2007/0093698 A1*  4/2007 Goldberger ........ A61B 5/14532
                                                                600/310
2017/0267532 A1*  9/2017 Liu ....................... C01B 32/174
2018/0355194 A1* 12/2018 Yadavalli ............. C09D 11/106

FOREIGN PATENT DOCUMENTS

| CN | 107221447 A | * | 9/2017 |
| KR | 100737663 B1 | | 7/2007 |
| KR | 1020130119318 A | | 10/2013 |
| KR | 1020160090108 A | | 7/2016 |
| KR | 1020170006280 A | | 1/2017 |

OTHER PUBLICATIONS

Zhu et al., A Highly Durable, Transferable, and Substrate-Versatile High-Performance All-Polymer Micro-Supercapacitor with Plug-and-Play Function, 2017, Adv. Mater. 2017, 29, 1605137, pp. 1-7 (Year: 2017).*
Fan et al., Graphene networks for high-performance flexible and transparent supercapacitors, RSC Adv, 2014, 4, 36996-37002 (Year: 2014).*
Eom et al., Stretchable Complementary Split Ring Resonator (CSRR)-Based Radio Frequency (RF) Sensor for Strain Direction and Level Detection, Sensors 2016, 16, 1667, 1-12 (Year: 2016).*

* cited by examiner

*Primary Examiner* — Eric W Thomas
(74) *Attorney, Agent, or Firm* — Cantor Colburn LLP

(57) ABSTRACT

A sticker-type electronic device which is freely detachably attachable to various bodies repeatedly is provided. The electronic device includes a main substrate which exhibits a surface adhesion property due to the properties of a material thereof and which provides an attachment/detachment surface to an article, and an electrode formed by being transferred from a temporary substrate to a surface that is opposite to the attachment/detachment surface of the main substrate to the article wherein the electrode is transferred directly to the main substrate using the adhesion property of the main substrate. The electronic device is freely detachably attachable to the surface of the article repeatedly using the surface adhesion property of the main substrate. The electronic device is formed directly on the surface of the substrate constituted by the material having the surface adhesion property, thereby providing a sticker-type electronic device which is freely repeatedly detachably attachable to various bodies.

3 Claims, 8 Drawing Sheets

FREELY DETACHABLE STICKER-TYPE ELECTRONIC DEVICE, METHOD OF MANUFACTURING THE SAME, AND METHOD OF FORMING ELECTRODE FOR THE SAME

This research was financially supported by the Framework of the Research and Development Program of the Korea Institute of Energy Research (KIER) (Grant no. B8-2417-02).

BACKGROUND OF THE INVENTION

1. Field of the Invention

The present invention relates to a sticker-type electronic device which is freely detachably attachable to any body repeatedly, a method of manufacturing the same, and a method of forming an electrode for the same. More particularly, the present invention relates to a sticker-type electronic device which is freely detachably attachable to a desired position repeatedly using a substrate whose material exhibits a surface adhesion property, a method of manufacturing the same, and a method of forming an electrode for the same.

2. Description of the Related Art

Batteries are the biggest source of power for the future energy industry, ranging from IT apparatuses such as smart phones, tablet apparatuses, notebooks, and smart watches to environmentally friendly transportation vehicles. As Internet-of-Things (IoT) products and electric vehicles become commercialized and popularized, the supply of batteries is expected to increase beyond the present state, and high-capacity and high-efficiency battery technologies will become more important. In addition, currently, the advent of the fourth industrial revolution era, in which people, objects, and spaces are connected with each other using advanced information and communication technologies such as artificial intelligence (AI), the Internet of Things (IOT), big data, mobiles, and robots, is underway. A battery technology may be one of the most important technologies to realize the fourth industrial revolution era. In particular, in order to enable "the state in which all things are interconnected", which is the core of the fourth industrial revolution, energy needs to be continuously supplied to independent mobile apparatuses using the battery, so the range of industries to which batteries will be applied is expected to become broader than at present. Accordingly, battery technology is expected to become more important.

A conventional battery has a standardized shape, such as that of a cylinder, a square, and a pouch, and has a limitation in integration of energy storage capacity, which makes it difficult to apply to wearable devices or subminiature devices such as micro devices requiring high integration. Recently, lithium thin film batteries have been actively developed as next-generation energy conversion devices for wearable devices and micro devices. Research into the development of future batteries, such as curved batteries, flexible batteries, cable-type batteries, and micro supercapacitors, which surpass commonly known ideas, is actively under way. However, the conventional lithium thin film battery is a thin-film-type lithium battery in which thin films having a micrometer thickness are integrated, and has drawbacks in that the battery is inherently dangerous because it contains lithium and also has a short cycle life. Further, although one example of technologies such as curved batteries, flexible batteries, and cable-type batteries is disclosed in Patent Document 1 or Patent Document 2, there are problems such as high costs, safety problems, low capacity, low efficiency, and complicated manufacturing processes. Therefore, it is necessary to develop a new future energy storage device that surpasses ideas that are commonly known worldwide and is characterized by high capacity, high efficiency, high safety, a long life, design flexibility, and low cost.

PRIOR ART DOCUMENT

Korean Laid-Open Patent Application No. 2016-0090108
Korean Laid-Open Patent Application No. 2017-0006280

SUMMARY OF THE INVENTION

Accordingly, the present invention has been made keeping in mind the above problems occurring in the related art, and an object of the present invention is to provide a sticker-type electronic device which is freely detachably attachable to a desired position repeatedly and which does not need to be manufactured in a standardized form, thus ensuring design flexibility while having high capacity, high efficiency, high safety, long life, and low cost characteristics, and a method of manufacturing the same.

Another object of the present invention is to provide a method of forming an electrode for constituting an electronic device on a substrate which is freely detachably attachable to various bodies repeatedly without using a separate adhesive to form an adhesive layer.

In order to accomplish the above objects, the present invention provides a sticker-type electronic device which is freely detachably attachable to the surface of an article repeatedly using a surface adhesion property of a main substrate. The sticker-type electronic device includes the main substrate, which exhibits the surface adhesion property due to the properties of the material thereof and which provides an attachment/detachment surface to the article, and an electrode formed by being transferred from a temporary substrate to a surface that is opposite to the attachment/detachment surface of the main substrate to the article wherein the electrode is transferred directly to the main substrate using the adhesion property of the main substrate. The main substrate exhibits the surface adhesion property due to the properties of the material thereof, and the electrode may be fixed to the main substrate using the adhesion property of the main substrate. Accordingly, a separate adhesive layer for fixing the electrode to the main substrate may not be interposed between the main substrate and the electrode.

It is preferable that the main substrate include at least one material selected from among PDMS (polydimethylsiloxane), a metal-catalyzed silicon rubber, and a Pt-catalyzed silicon rubber (e.g., Ecoflex (trade name, Smooth-on Corporation)).

PDMS (polydimethylsiloxane) and Ecoflex (trade name, Smooth-on Corporation) are flexible materials and exhibit an adhesive property as a surface property thereof, thus being freely detachably attachable to various bodies repeatedly without using a separate adhesive to form an adhesive layer. Ecoflex, which is expressed by a trade name, is almost similar in component to PDMS, but unlike PDMS, it constitutes product groups having various compositions, in which a small amount of metal such as Pt is added to control the degree of curing. Ecoflex may be expressed by a 'metal-catalyzed silicon rubber' or a 'Pt-catalyzed silicon rubber'.

Meanwhile, the electronic device may be an energy storage device, and specifically may be a secondary battery, an electrochemical capacitor, or a redox battery.

Specifically, the electronic device may be an electrochemical capacitor which includes a positive electrode and a negative electrode formed on the front surface part of the main substrate, current collectors each attached to the positive electrode and the negative electrode, a gel electrolyte applied on the positive electrode and the negative electrode, and a sealing member covering the front surface part of the main substrate. The positive electrode and the negative electrode may be electrodes of a graphene material patterned in an interdigitated shape.

Moreover, the electronic device may be a concentration-cell-type oxygen sensor having a structure similar to that of the secondary battery.

In order to accomplish the above objects, the present invention also provides a method of manufacturing a freely detachable and attachable sticker-type electronic device. The electronic device includes an electrode and a main substrate of a flexible material exhibiting a surface adhesion property due to the properties of a material thereof to thus provide an attachment/detachment surface to an article. The process for forming the electrode includes forming the electrode on a temporary substrate, applying a main substrate precursor on the temporary substrate including the electrode formed thereon, forming the main substrate by curing the main substrate precursor, and separating the cured main substrate from the temporary substrate to thus move the electrode to the surface of the main substrate. The main substrate exhibits the surface adhesion property due to the properties of the material thereof, so that the electrode is moved to the main substrate due to the adhesion property of the main substrate, thereby forming the electrode directly on the surface of the main substrate exhibiting the surface adhesion property due to the properties of the material thereof.

Meanwhile, another embodiment of the present invention provides a method of manufacturing a freely detachable and attachable sticker-type electronic device. The electronic device includes an electrode and a main substrate of a flexible material exhibiting a surface adhesion property due to the properties of a material thereof to thus provide an attachment/detachment surface to an article. The process for forming the electrode includes forming the electrode on a temporary substrate, forming the main substrate by curing a main substrate precursor, attaching the cured main substrate to the temporary substrate including the electrode formed thereon, and separating the main substrate from the temporary substrate to thus move the electrode to the surface of the main substrate. The main substrate exhibits the surface adhesion property due to the properties of the material thereof, so that the electrode is moved to the main substrate due to the adhesion property of the main substrate, thereby forming the electrode directly on the surface of the main substrate exhibiting the surface adhesion property due to the properties of the material thereof.

Since the main substrate according to the present invention exhibits the surface adhesion property due to the properties of the material thereof, the electrode formed on the temporary substrate is capable of being transferred to the main substrate due to the adhesion property of the main substrate without forming a separate adhesive layer using an adhesive.

It is preferable that the main substrate include at least one material selected from among PDMS (polydimethylsiloxane), a metal-catalyzed silicon rubber, and a Pt-catalyzed silicon rubber (e.g., Ecoflex (trade name, Smooth-on Corporation)).

Specifically, in the manufacturing method according to the present invention, a solution including a Pt-catalyzed silicon rubber and a curing agent mixed at a mass ratio of 1:10 to 10:1, preferably 1:2 to 2:1, and more preferably 1:1 is used as the main substrate precursor. A step of forming the main substrate may include drying the main substrate precursor applied on the temporary substrate at 15 to 120° C. for 5 minutes to 48 hours, preferably at 15 to 80° C. for 1 hours to 24 hours, and more preferably at 15 to 30° C. for 8 hours to 15 hours. Further, selectively, a solution including PDMS (polydimethylsiloxane) and a curing agent mixed at a mass ratio of 2:1 to 20:1, preferably 5:1 to 15:1, and more preferably 10:1 may be used as the main substrate precursor. The step of forming the main substrate may include drying the main substrate precursor applied on the temporary substrate at 30 to 120° C. for 10 minutes to 10 hours, preferably at 40 to 80° C. for 30 minutes to 6 hours, and more preferably at 60° C. for 2 hours to 4 hours.

PDMS (polydimethylsiloxane) and Ecoflex (trade name, Smooth-on Corporation) are flexible materials and exhibit the adhesion property as the surface property thereof, thus being freely detachably attachable to various bodies without forming a separate adhesive layer using an adhesive. However, it is very difficult to form an electrode on a substrate using these materials in the substrate. Therefore, conventionally, the materials are applied for use instead of forming an adhesive layer on a lower plate after forming an electronic device on a separate flexible substrate. When PDMS or Ecoflex is applied on a separately manufactured electronic device, it is difficult to ensure adhesion with the flexible substrate, which causes a problem of peeling. In the present invention, a specific method of directly forming electrodes and electronic devices on the surface of a substrate constituted by a material having a surface adhesion property such as PDMS or Ecoflex is adopted. Moreover, repeated detachment and attachment from and to the surfaces of various bodies is made possible by using the surface adhesion property of the substrate.

The electronic device may be specifically an energy storage device such as a secondary battery, an electrochemical capacitor, or a redox battery. Moreover, the electronic device may be a concentration-cell-type oxygen sensor having a structure similar to that of the secondary battery.

According to the method of manufacturing the electronic device of the present invention, since the electrode is directly formed on the surface of the substrate constituted by the material having the surface adhesion property, the electrode is formed directly on the substrate of the material freely detachably attachable to various bodies, thereby providing an electronic device which is freely repeatedly detachably attachable to surfaces of various bodies.

Further, the method of forming the electrode of the present invention adopted in the method of manufacturing the freely detachable and attachable sticker-type electronic device of the present invention provides a method of directly transferring an electrode for constituting the electronic device on the substrate exhibiting the surface adhesion property due to the properties of the material thereof.

Specifically, the method of forming the electrode according to the present invention includes forming an electrode on a temporary substrate, applying a main substrate precursor on the temporary substrate including the electrode formed thereon, forming a main substrate by curing the main substrate precursor, and separating the cured main substrate from the temporary substrate to thus move the electrode to the surface of the main substrate. The main substrate exhibits the surface adhesion property due to the properties of the material thereof, so that the electrode is moved to the main substrate due to the adhesion property of the main substrate without using a separate adhesive.

Further, a method of forming an electrode according to another aspect of the present invention includes forming an electrode on a temporary substrate, forming a main substrate by curing a main substrate precursor, attaching the cured main substrate to the temporary substrate including the electrode formed thereon, and separating the main substrate from the temporary substrate to thus move the electrode to the surface of the main substrate. The main substrate exhibits the surface adhesion property due to the properties of the material thereof, so that the electrode is moved to the main substrate due to the adhesion property of the main substrate without using a separate adhesive.

It is preferable that the main substrate include at least one material selected from among PDMS, a metal-catalyzed silicon rubber, and a Pt-catalyzed silicon rubber (e.g., Ecoflex (trade name, Smooth-on Corporation)).

The present invention has been developed in order to directly manufacture an electronic device on a substrate using a material having the surface adhesion property in the substrate. The electrode for manufacturing the electronic device is formed on the separate temporary substrate and then transferred to the surface of the main substrate constituted by the material having the surface adhesion property. The electrode is moved by the transferring described above, thereby being directly formed on the surface of the substrate constituted by the material having the surface adhesion property. Accordingly, the electronic device may be directly formed on the substrate of the material which is freely detachably attachable to various bodies repeatedly.

Further, since the electrode is formed on the separate temporary substrate and then transferred in the present invention, it is possible to form a plurality of electrodes disposed so as to be spaced apart from each other on the same surface. In particular, like an energy storage device, it is also possible to form an electrode in which a positive electrode and a negative electrode are separated from each other and which is patterned in a complex form in order to increase the surface area thereof.

In the present invention having the above-described constitution, an electrode for manufacturing an electronic device is formed on a separate temporary substrate and then transferred to the surface of a main substrate constituted by the material having the surface adhesion property. Accordingly, the electrode and the electronic device are formed directly on the surface of the substrate constituted by the material having the surface adhesion property.

Further, the electronic device is formed directly on the surface of the substrate constituted by the material having the surface adhesion property, thereby providing a sticker-type electronic device which is freely repeatedly detachably attachable to various bodies.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Examples according to the present invention will be described in detail with reference to the accompanying drawings.

Figure 1:
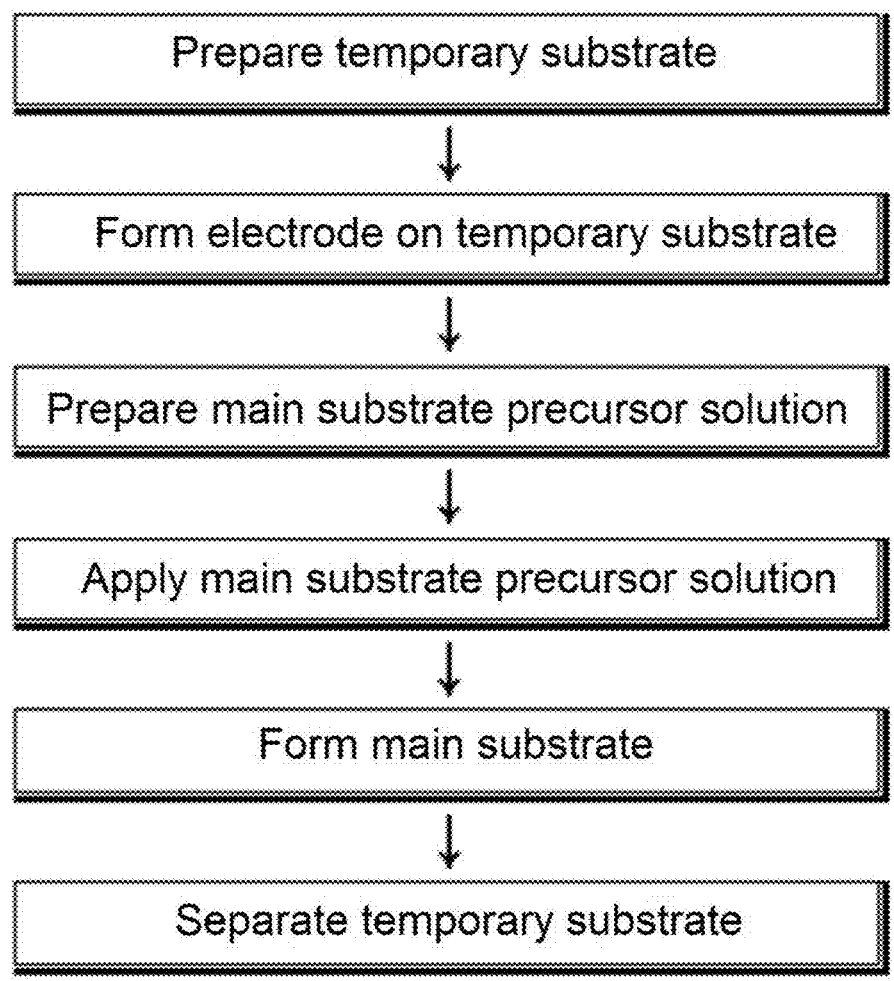
FIG. 1 is a flowchart showing a method of forming an electrode according to an Example of the present invention.

FIG. 1 is a flowchart showing a method of forming an electrode of a freely detachable and attachable sticker-type electronic device according to an Example of the present invention.

In the present specification, a "temporary substrate" means a substrate which is conventionally used in order to form an electrode and which is surface-treated, and is referred to as a "temporary substrate" because it is removed in a subsequent step.

A "main substrate" is the substrate on which the electrode is ultimately positioned in the present invention. The method of forming the electrode of FIG. 1 will be described below with reference to specific Examples, and is characterized in that the electrode is formed on the temporary substrate and then transferred to the main substrate and in that a main substrate precursor solution is applied on the electrode formed on the temporary substrate to thus form the main substrate.

Example 1-1

Formation of Electrode on Temporary Substrate

First, a Si substrate was prepared as a temporary substrate, and more particularly, a $SiO_2/Si$ substrate in which a $SiO_2$ layer of 300 nm was applied on the surface thereof was prepared.

In the present Example, since the electrode was sufficiently moved due to the surface adhesion property of the main substrate to be subsequently formed, the temporary substrate was not subjected to additional treatment. However, in the case where the adhesion force between the temporary substrate and the electrode is very strong, the surface of the temporary substrate may be treated, so that the electrode is easily separated.

A graphene-based electrode is formed on the surface of the prepared temporary substrate. An electrode having a structure in which a positive electrode and a negative electrode are spaced apart from each other is formed for a micro super-capacitor, which is the device to be ultimately manufactured in the present Example.

Figure 2:
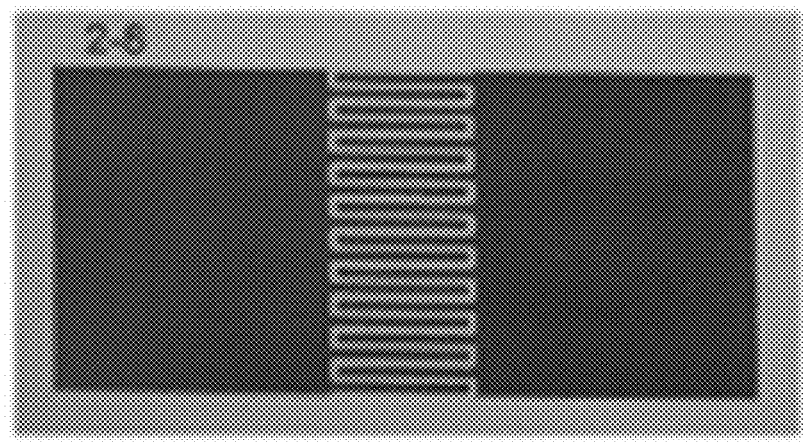
FIG. 2 is a picture obtained by photographing a graphene electrode formed on the surface of a temporary substrate according to Example 1-1 of the present invention.

FIG. 2 is a picture obtained by photographing the graphene electrode formed on the surface of the temporary substrate according to Example 1-1 of the present invention.

In the case of the micro super-capacitor, an energy storage capacity is increased as the area in which the positive electrode and the negative electrode face each other is increased. Accordingly, the electrode was formed by performing patterning so as to ensure a structure in which ten repeated interdigitated portions where protrusions of the positive electrode and the negative electrode spaced apart from each other as shown in the drawing were interdigitated with each other were formed.

Since the $SiO_2$/Si substrate used as the temporary substrate is used in the related art, the overall process of forming the graphene electrode of FIG. 2 may be performed by applying conventional techniques, and therefore, a detailed description thereof will be omitted.

Formation of Main Substrate and Electrode Transferring

A Pt-catalyzed silicon rubber (trade name: Ecoflex0030, Smooth-on Corporation) base was prepared as a precursor material for forming the main substrate, and was mixed with a curing agent at a mass ratio of about 1:1. The mixture, which was not cured, but was present in a solution state, was applied on the temporary substrate on which the graphene electrode was formed.

In addition, a main substrate precursor solution was dried at 15 to 30° C. for 8 hours to 15 hours to thus cure the Ecoflex, thereby manufacturing a main substrate. The main substrate precursor solution may exhibit sufficient fluidity to be applied very thinly, and the main substrate may be formed to a thickness that is adjusted to the thickness of the substrate required in a final electronic device.

Then, the cured main substrate was separated from the temporary substrate. Due to the surface adhesion property of Ecoflex0030, constituting the main substrate, the graphene electrode placed on the temporary substrate was transferred to the main substrate.

Figure 3:
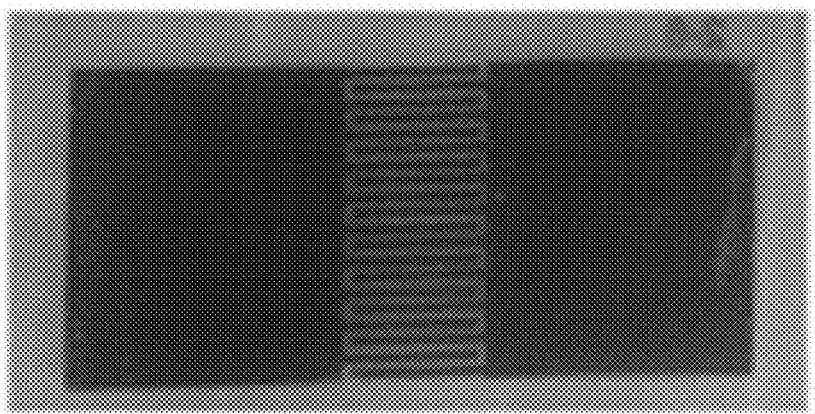
FIG. 3 is a picture obtained after the graphene electrode on the surface of the temporary substrate is transferred to the surface of a main substrate according to Example 1-1 of the present invention.

FIG. 3 is a picture obtained after the graphene electrode on the surface of the temporary substrate is transferred to the surface of the main substrate according to Example 1-1 of the present invention.

From the drawing, it can be confirmed that the patterned graphene electrode was directly transferred to the surface of the main substrate of the Ecoflex0030 material while maintaining ten repeated interdigitated portions.

Example 1-2

Formation of Electrode on Temporary Substrate

A graphene electrode was formed on a temporary substrate using the same process as the above-described Example.

Figure 4:
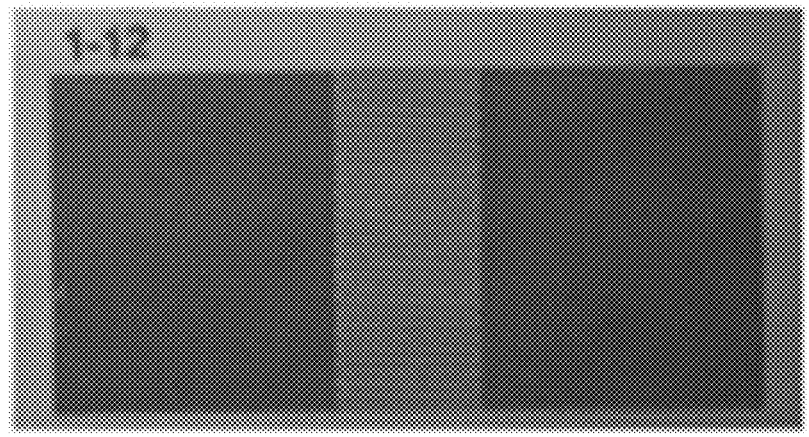
FIG. 4 is a picture obtained by photographing a graphene electrode formed on the surface of a temporary substrate according to Example 1-2 of the present invention.

FIG. 4 is a picture obtained by photographing the graphene electrode formed on the surface of the temporary substrate according to Example 1-2 of the present invention.

The present Example is the same as the above-described Example, except for the structure in which twenty repeated interdigitated portions are formed, and thus a detailed description thereof will be omitted.

Formation of Main Substrate and Electrode Transferring

A Sylgard 184 (trade name, Dow Corning Corporation) base was prepared as a precursor material for forming a main substrate of a PDMS (polydimethylsiloxane) material, and was mixed with a curing agent at a mass ratio of about 10:1. The mixture, which was not cured, but was present in a solution state, was applied on a temporary substrate on which a graphene electrode was formed.

After removing air bubbles from the applied solution using a vacuum desiccator, the PDMS was dried in an oven at a temperature of about 60° C. for 2 to 4 hours to thus be cured, thereby manufacturing a main substrate.

Then, the cured main substrate was separated from the temporary substrate. Due to the surface adhesion property of the PDMS constituting the main substrate, the graphene electrode placed on the temporary substrate was directly transferred to the main substrate.

Figure 5:
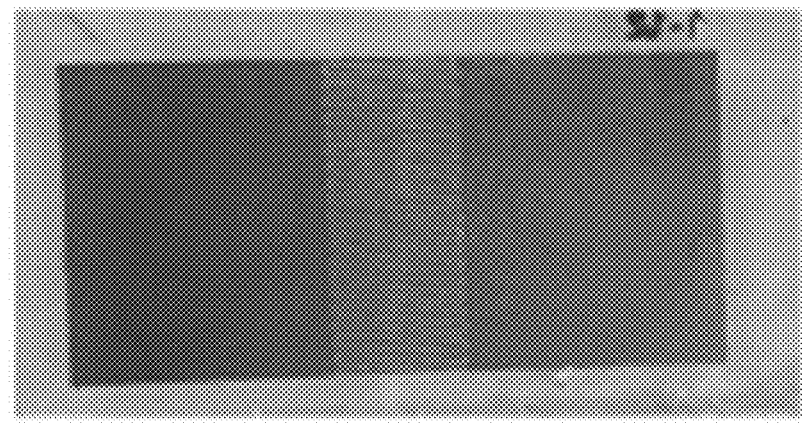
FIG. 5 is a picture obtained after the graphene electrode on the surface of the temporary substrate is transferred to the surface of a main substrate according to Example 1-2 of the present invention.

FIG. 5 is a picture obtained after the graphene electrode on the surface of the temporary substrate is transferred to the surface of the main substrate according to Example 1-2 of the present invention.

From the drawing, it can be confirmed that the patterned graphene electrode was transferred to the surface of the main substrate of the PDMS material while maintaining twenty repeated interdigitated portions.

Figure 6:
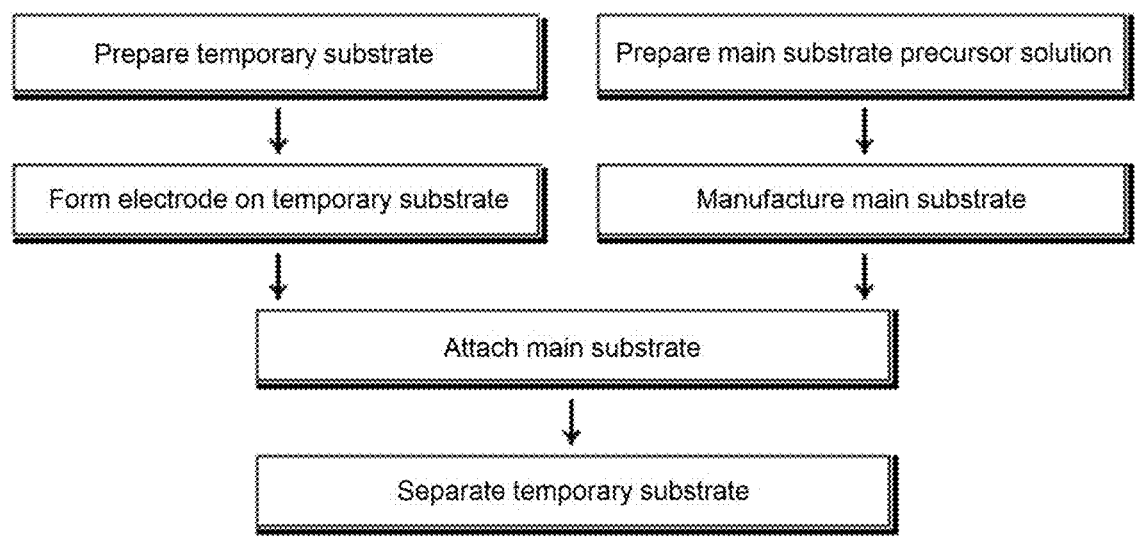
FIG. 6 is a flowchart showing a method of forming an electrode according to another Example of the present invention.

FIG. 6 is a flowchart showing a method of forming an electrode according to another Example of the present invention.

The method of forming the electrode of FIG. 6 will be described below with reference to specific Examples, and is characterized in that the electrode is formed on the temporary substrate and then transferred to the main substrate and in that the main substrate is manufactured using a separate process and then attached to the electrode formed on the temporary substrate.

Since the process of forming the electrode on the temporary substrate and the process of manufacturing the main substrate are performed separately, there is no relationship regarding the temporal order therebetween.

Example 2-1

Formation of Electrode on Temporary Substrate

As in Example 1-1, a graphene electrode patterned in an interdigitated shape was formed on a $SiO_2$/Si substrate.

In the present Example, since the electrode was sufficiently moved due to the surface adhesion property of the main substrate to be subsequently attached, the temporary substrate was not subjected to additional treatment. However, in the case where the adhesion force between the temporary substrate and the electrode is very strong, the surface of the temporary substrate may be treated so that the electrode is easily separated.

Manufacture of Main Substrate

In the present Example, the main substrate of the Ecoflex0030 material was used; however, unlike Example 1-1, the main substrate was first manufactured and then used.

An Ecoflex0030 base was mixed with a curing agent at a mass ratio of about 1:1 and then dried at 15 to 30° C. for 8 hours to 15 hours to thus cure the Ecoflex, thereby manufacturing the main substrate.

The solution was thinly spread in the shape of the substrate and cured. In Example 1-1 as well, the main substrate may be manufactured to a desired thickness. However, the present Example, in which the main substrate is formed in advance, is more advantageous than Example 1-1 in that the main substrate is manufactured to a desired thickness.

Transfer of Electrode on Main Substrate

The cured main substrate was attached to a temporary substrate, on which a graphene electrode was formed, and then separated therefrom, so that the graphene electrode placed on the temporary substrate was transferred to the main substrate.

The graphene electrode is transferred due to the surface adhesion property of the Ecoflex0030 constituting the main substrate. In order to increase the transfer efficiency, a predetermined pressure may be applied after the cured main substrate is attached to the temporary substrate on which the graphene electrode is formed.

Example 2-2

Formation of Electrode on Temporary Substrate

As in Example 1-2, a graphene electrode patterned in an interdigitated shape was formed on a $SiO_2/Si$ substrate.

Manufacture of Main Substrate

In the present Example, a main substrate of a PDMS material was used; however, unlike Example 1-2, the main substrate was first manufactured and then used.

A Sylgard 184 base was mixed with a curing agent at a mass ratio of about 10:1. After removing air bubbles from a solution using a desiccator in a vacuum, drying was performed in an oven at a temperature of about 60° C. for 2 to 4 hours to thus cure PDMS, thereby manufacturing the main substrate.

The solution was thinly spread in the shape of the substrate and cured. The present Example is more advantageous than Example 1-2 in manufacturing the main substrate to a desired thickness.

Transferring of Electrode on Main Substrate

The cured main substrate was attached to a temporary substrate, on which a graphene electrode was formed, and then separated therefrom, so that the graphene electrode placed on the temporary substrate was transferred to the main substrate.

The graphene electrode is transferred due to the surface adhesion property of the PDMS constituting the main substrate. In order to increase the transfer efficiency, a predetermined pressure may be applied after the cured main substrate is attached to the temporary substrate on which the graphene electrode is formed.

Through the above-described process, the graphene electrode formed on the main substrate of the material having the surface adhesion property was used to manufacture an electrochemical capacitor.

Example 3

Manufacture of Electrochemical Capacitor

Graphene electrodes transferred to a main substrate were used as a positive electrode and a negative electrode, and binders or conductive materials were not added thereto. A stainless steel foil as a current collector for connection with external wires was attached to the surface of each of the positive electrode and the negative electrode. An Ag paste may be used as a conductive adhesive for attaching the current collector, and the conductive adhesive is well sealed with epoxy so as not to be exposed to electrolytes.

A $PVA-H_2SO_4$ gel electrolyte was used as an electrolyte material filling a space between the positive electrode and the negative electrode, which were spaced apart from each other, and an extra separation membrane was not used between the positive electrode and the negative electrode. The $PVA-H_2SO_4$ gel electrolyte was manufactured by adding 1 g of $H_2SO_4$ to 10 mL of deionized water (DI water) and then dissolving 1 g of PVA at about 85° C. for 3 to 5 hours. The manufactured $PVA-H_2SO_4$ gel electrolyte was uniformly applied on the interdigitated graphene electrode, and the entire electrode was sealed to thus constitute an electrochemical capacitor. All of the materials including the main substrate were flexible materials, and the PDMS and Ecoflex0030 constituting the main substrate exhibited a surface adhesion property as the surface property thereof. Accordingly, the back surface on which a super-capacitor was formed was freely detachably attachable to various bodies repeatedly, whereby a sticker-type flexible super-capacitor was finally manufactured.

Figure 7:
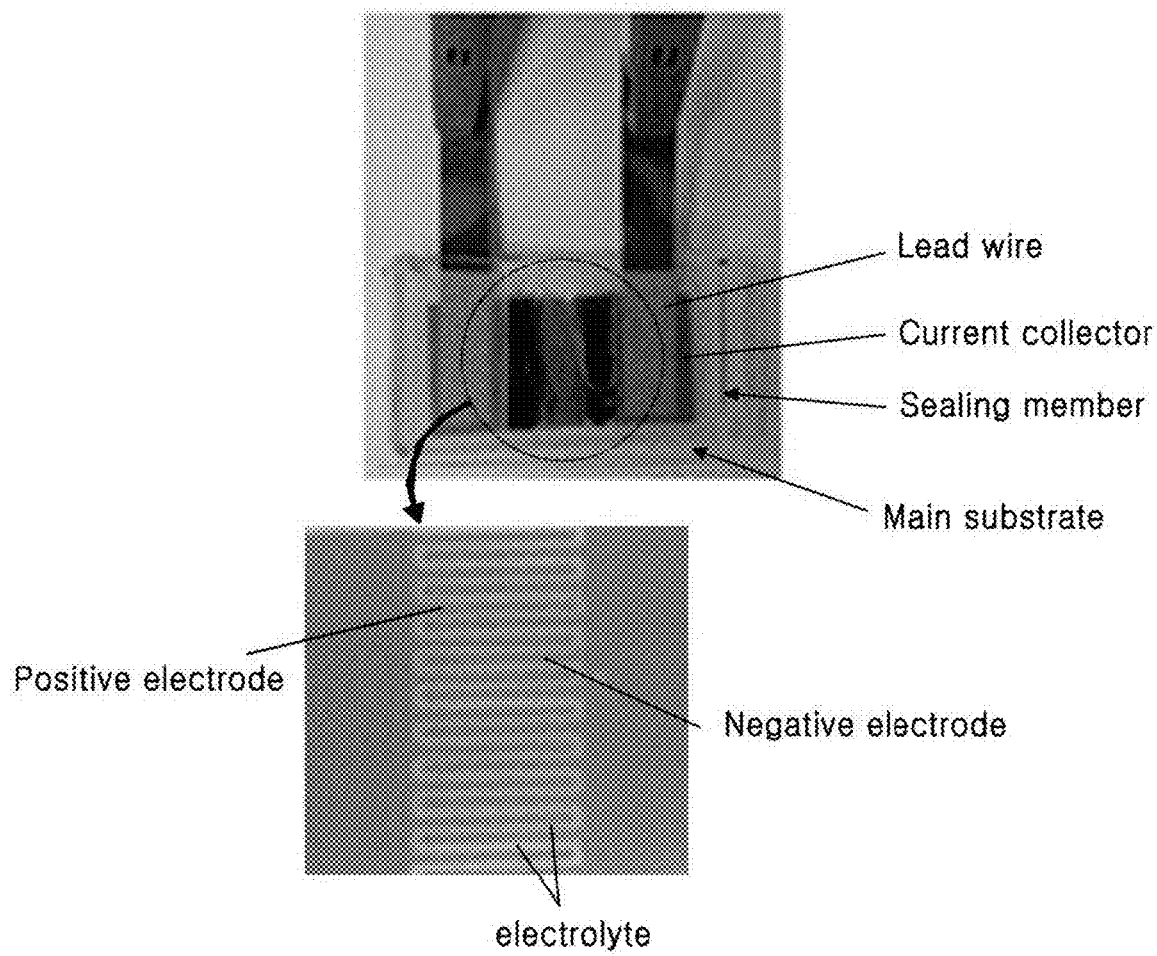
FIG. 7 is a view showing an electrochemical capacitor manufactured according to Example 3 of the present invention.

FIG. 7 shows an electrochemical capacitor manufactured according to Example 3 of the present invention.

<Test of Adhesion and Attachment-Detachment Properties>

The sticker-type flexible super-capacitor of the present Example manufactured using the above-described process was attached to various articles to check the adhesion property.

Figure 8:
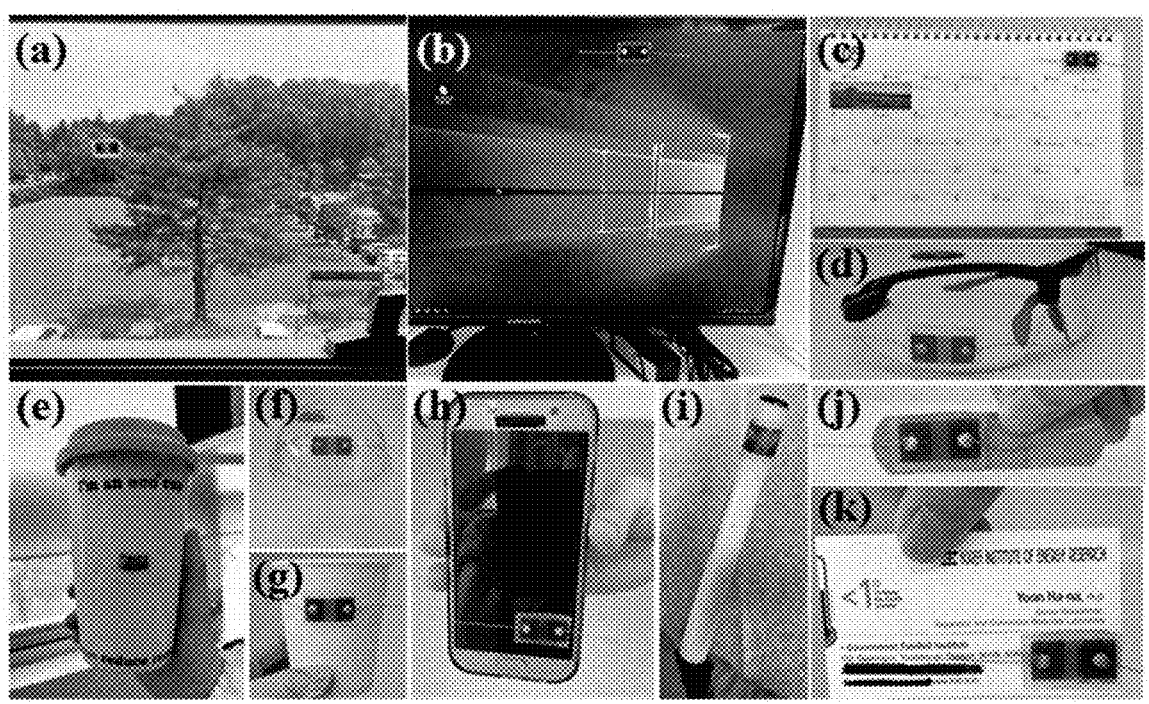
FIG. 8 is a picture obtained by photographing the electrochemical capacitor device of the present Example attached to various articles.

FIG. 8 is a picture obtained by photographing an electrochemical capacitor, e.g. a super-capacitor device of the present Example attached to various articles.

The super-capacitor of the present Example was attached to various bodies such as (a) a window, (b) a computer screen, (c) a calendar, (d) eyeglasses, (e) a tumbler, (f) a plastic cup, (g) a paper cup, (h) a cellular phone, (i) a pen, (j) plaster, and (k) a business card, and it could be confirmed that the super-capacitor of the present Example was attachable to various bodies without forming a separate adhesive layer using an adhesive.

Next, whether the sticker-type flexible super-capacitor of the present Example was capable of being repeatedly attached and detached was confirmed.

Figure 9:
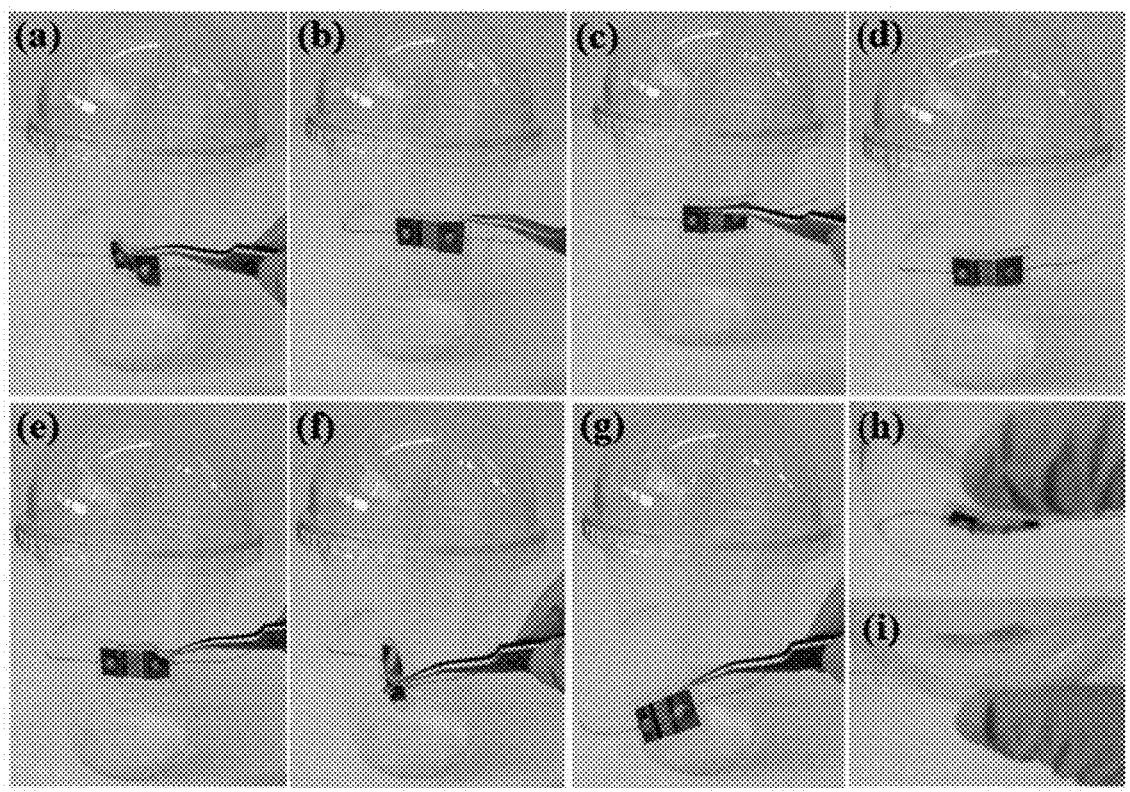
FIG. 9 is a picture obtained by photographing repeated attachment and detachment of the electrochemical capacitor device according to the present Example to and from the surface of a disposable cup.

FIG. 9 is a picture obtained by photographing repeated attachment and detachment of the electrochemical capacitor, e.g. a super-capacitor device according to the present Example to and from the surface of a disposable cup.

(a) to (d) are pictures obtained by photographing a process of attaching the sticker-type flexible super-capacitor of the present Example to the surface of the disposable cup, and (e) to (g) are pictures obtained by photographing a process of removing the super-capacitor from the surface of the disposable cup.

As shown in the drawing, the super-capacitor of the present Example could be attached to and removed from the surface of the disposable cup. Since a separate adhesive for forming an adhesive layer was not used, it can be confirmed that the adhesive did not remain.

(h) and (i) are pictures showing the adhesion force confirmed by applying a force after reattaching the super-capacitor of the present Example to the surface of the disposable cup, and it can be confirmed that even when reattached, excellent adhesion force was exhibited as in the case of the first adhesion.

From the above-described results, it can be confirmed that the super-capacitor of the present Example is freely repeatedly detachably attachable to various bodies due to the surface property of the material constituting the main substrate without forming a separate adhesive layer using an adhesive.

<Test of Electrochemical Property>

First, cycle stabilization was performed in a voltage range from 0 V to 1 V, and a cyclic voltammetric (CV) test was performed while a scanning rate was changed from 5 mV/s to 50 mV/s.

The electrochemical property was measured using potentiostat (VSP potentiostat/galvanostat/EIS, BioLogic) equipment having multiple channels and a cyclic voltammetry (CV) test, and a specific areal capacitance value was calculated using the following Equation (1).

$$C_{sp} = \frac{\frac{2}{\Delta V \times v} \times \int I dV}{A} \quad \text{Equation (1)}$$

In the equation, $C_{sp}$ is a specific areal capacitance based on a single electrode (F/cm$^2$), I is a discharge current (A), $\Delta V$ is a change in voltage according to discharging, A is an electrode area (cm$^2$), and v is a scanning rate (dV/dt).

Figure 10:
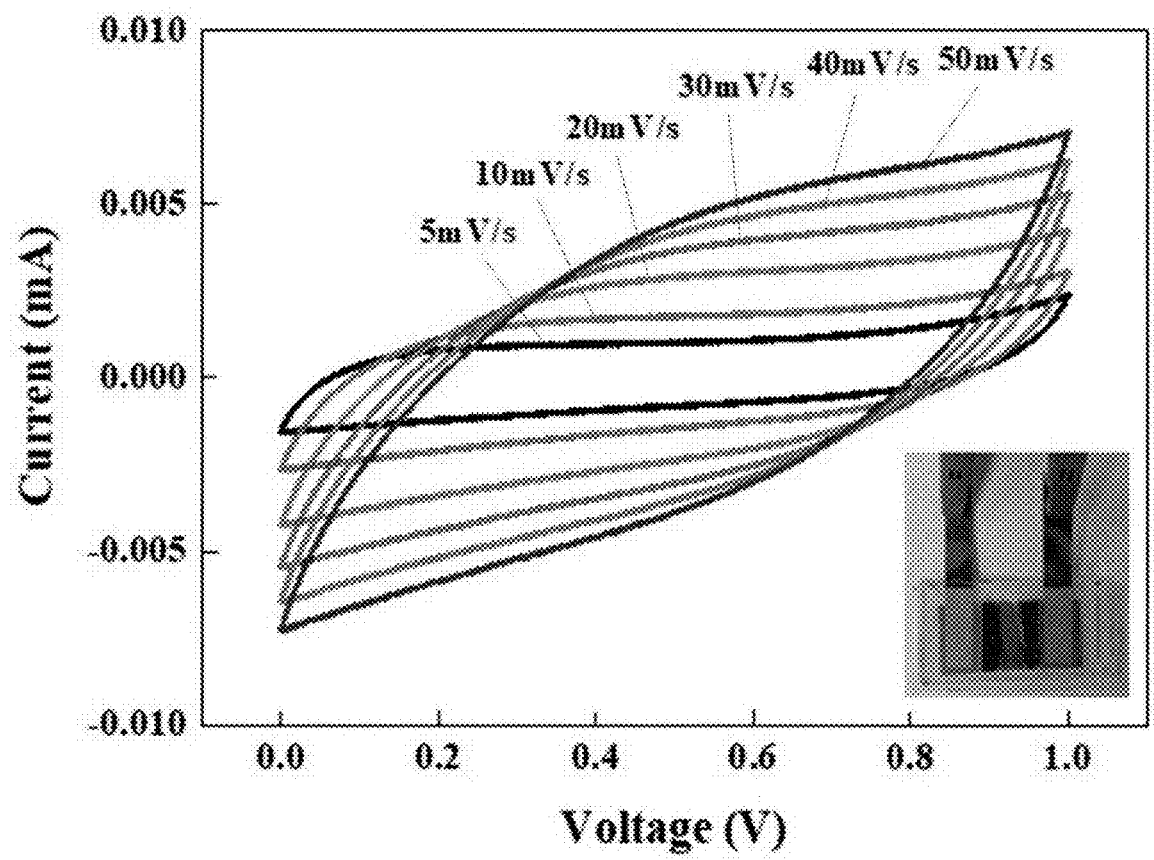
FIG. 10 is a view showing a cyclic voltammogram of the electrochemical capacitor of the present Example measured under various scanning rate conditions.

FIG. 10 is a view showing a cyclic voltammogram of the super-capacitor of the present Example measured under various scanning rate conditions.

As a result, referring to FIG. 10, it could be confirmed that a specific areal capacitance value per area of the capacitor electrode was measured to be about 1.3 mF/cm$^2$ at a scanning rate of 5 mV/s and about 1.0 mF/cm$^2$ at a scanning rate of 10 mV/s. Accordingly, it could be seen that the specific areal capacitance value per area of the super-capacitor according to the present Example was higher than 322.8 µF/cm$^2$, which was the specific areal capacitance value per area based on the single electrode of the graphene-based micro super-capacitor, as reported in Nat. Commun. 2013, 4: 2487, 1-8.

As described above, although the super-capacitor of the present Example is manufactured using PDMS and Ecoflex0030, which are materials having the surface adhesion property instead of a conventional general substrate, it can be seen that the characteristics of the super-capacitor are sufficiently exhibited and that the super-capacitor can be used as an energy storage device.

Although the Examples described above are described so as to specify the manufacture of an electrochemical capacitor using a graphene electrode, the scope of application of the present invention is not limited thereto.

It will be apparent that the present invention is applicable to electrodes including all kinds of materials and is also applicable to all kinds of electronic devices without impairing the characteristics of the present invention. For example, the present invention is applicable to various types of energy storage devices having a positive electrode and a negative electrode spaced apart from each other, and is also applicable to secondary batteries based on energy storage principles different from that of the present invention. Further, the present invention is applicable to a concentration-cell-type oxygen sensor having a structure similar to that of a secondary battery.

Although the preferred embodiments of the present invention have been disclosed for illustrative purposes, those skilled in the art will appreciate that various modifications, additions and substitutions are possible, without departing from the technical idea of the present invention. Therefore, the scope of the present invention should be construed as being covered by the scope of the appended claims, rather than the specific embodiments, and all technical ideas falling within the scope of the claims should be construed as being included in the scope of the present invention.

What is claimed is:

1. A sticker-type electronic device which is freely detachably attachable to a surface of an article repeatedly using a surface adhesion property of a main substrate, the sticker-type electronic device comprising:
    the main substrate, which is a single layer and exhibits the surface adhesion property due to a property of a material thereof and which provides an attachment/detachment surface to the article; and
    an electrode formed on a surface that is opposite to the attachment/detachment surface of the main substrate to the article, wherein the electrode is transferred directly to the main substrate using the adhesion property of the main substrate without forming a separate adhesive layer from the main substrate,
    wherein the main substrate includes at least one material selected from among PDMS (polydimethylsiloxane), and a Pt-catalyzed silicon rubber,
    wherein the electrode includes a positive electrode and a negative electrode of a graphene material patterned in an interdigitated shape on a front surface part of the main substrate, and the electronic device is an electrochemical capacitor which includes the positive electrode and the negative electrode formed on the front surface part of the main substrate, current collectors each attached to the positive electrode and to the negative electrode, a gel electrolyte applied on the positive electrode and the negative electrode, and a sealing member covering the front surface part of the main substrate.

2. The sticker-type electronic device of claim 1, wherein the main substrate is manufactured by drying a precursor solution including a Pt-catalyzed silicon rubber and a curing agent mixed at a mass ratio of 1:10 to 10:1 at 15 to 120° C. for 5 minutes to 48 hours.

3. The sticker-type electronic device of claim 1, wherein the main substrate is manufactured by drying a precursor solution including PDMS (polydimethylsiloxane) and a curing agent mixed at a mass ratio of 2:1 to 20:1 at 30 to 120° C. for 10 minutes to 10 hours.

* * * * *